Oct. 15, 1963    W. McNENNEY    3,107,192
APPARATUS FOR SHAPING TIRES
Filed March 16, 1960
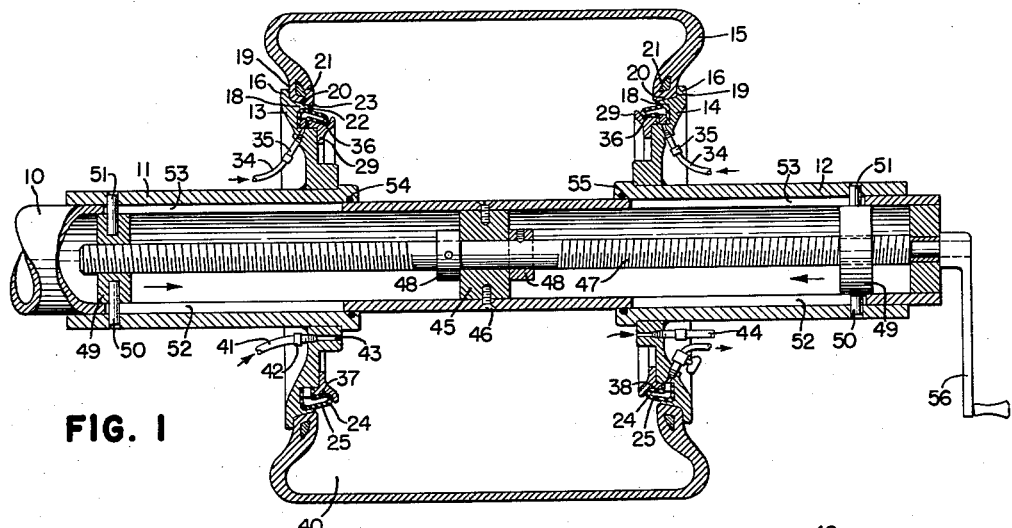
FIG. 1
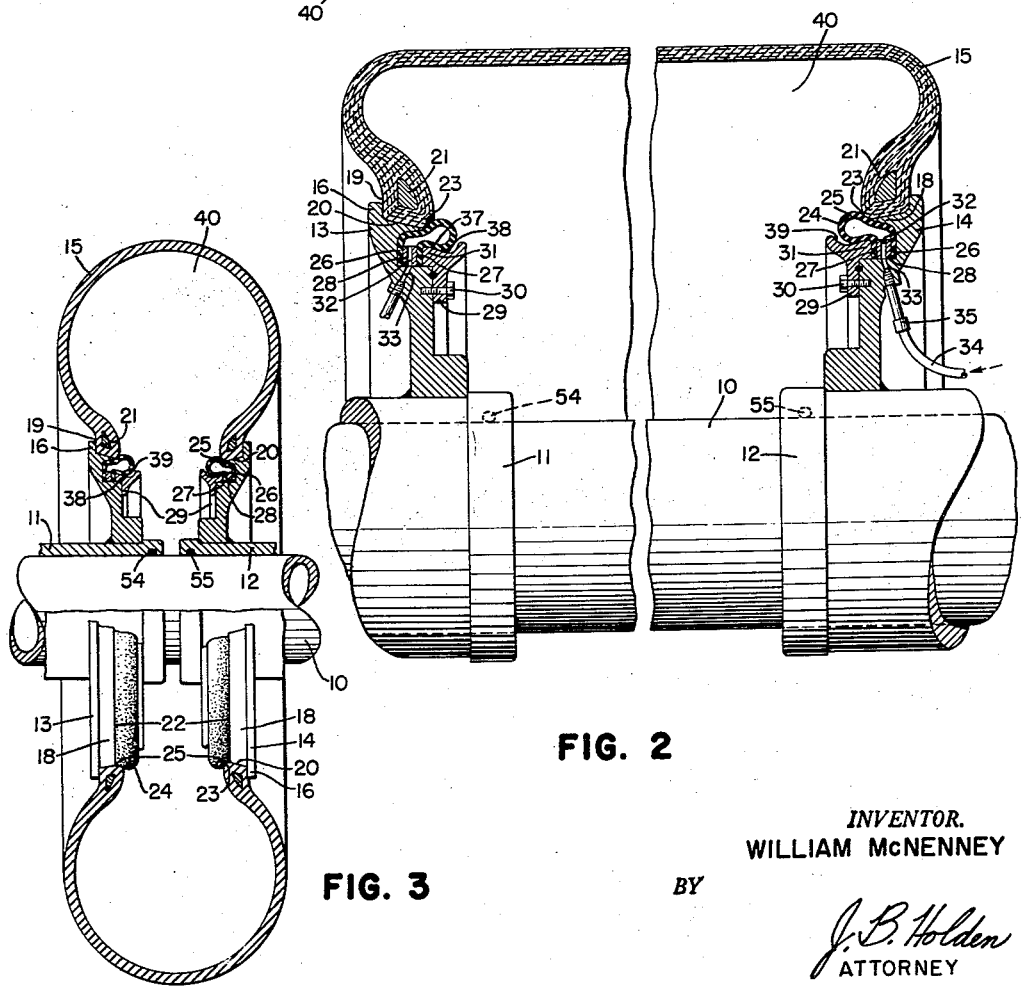
FIG. 2
FIG. 3
INVENTOR.
WILLIAM McNENNEY
BY
J. B. Holden
ATTORNEY United States Patent Office 3,107,192
Patented Oct. 15, 1963

3,107,192
APPARATUS FOR SHAPING TIRES
William McNenney, Akron, Ohio, assignor to The Goodyear Tire & Rubber Company, Akron, Ohio, a corporation of Ohio
Filed Mar. 16, 1960, Ser. No. 15,313
5 Claims. (Cl. 156—416)

This invention relates to an apparatus for shaping tires and, more particularly, to an apparatus for shaping green tire carcasses built in the so-called "flat band" method.

In order to make clear many of the important advantages of the machine of the present application, it should be understood that the conventional method of building tires is the so-called "flat band" method in which the plies of rubberized cord fabric constituting the carcass are laid over a flat drum-like structure, and the edges of the plies are wrapped in various methods about the beads. After the tread, breaker, and chafers are applied, the drum is collapsed and the tire in "flat band" form is removed, shaped, and cured.

In many tire constructions which are becoming more prevalent today, the breaker structure is substantially longitudinally inextensible and, therefore, must be applied to the tire carcass after the carcass is shaped into tire form. The present invention relates to an apparatus for shaping a green tire prior to application of the breaker and tread but it is to be understood that the invention is not necessarily confined to the building of such tires, but may be used prior to curing to shape green tires after application of the breaker and tread secured thereto.

An object of this invention is to provide a tire shaping apparatus for shaping a green tire carcass built in the form of a flat band which permits the application of fluid pressure directly to the internal surface of the tire carcass.

A further object of the invention is to provide an apparatus for shaping tires by means of fluid pressure which is so constructed that the tire may be removed from the apparatus without causing the carcass to buckle and/or distort.

Other objects and advantages of the present invention will become apparent as the description thereof proceeds.

In the drawings,

FIG. 1 is a longitudinal cross-sectional view of the apparatus of this invention with parts broken away and in cross section;

FIG. 2 is an enlarged partial cross-sectional view with parts broken away and in cross section;

FIG. 3 is a view similar to FIG. 1 with the apparatus in position for shaping the tire in toric or tire shape.

Referring to the drawings, a horizontal shaft 10 is mounted in suitable bearings for rotation in either direction. A pair of cylindrical slide members 11 and 12 are mounted on the shaft 10 and are adapted to be reciprocated axially of the shaft 10. Each of the members 11 and 12 is provided with a disc 13 and 14, respectively, upon which the green tire carcass 15 built in the form of a flat band is mounted. Since the construction and operation of each of the discs 13 and 14 is substantially identical, like parts thereof are referred to by the same numeral and a description of disc 13 will suffice to describe the structure of disc 14. Each disc 13 and 14 is provided, respectively, with an annular radially extending flange 16 and a axially extending flange 18 which engage, respectively, the heel 19 and base portion 20 of the bead of carcass 15. The axially extending flanges 18 terminate at 22, a short distance from the toe area 23 of the bead portions of the tire carcass 15.

An inflatable, flexible tube or annulus 24 is supported on each disc 13 and 14. The annuli 24 are provided with an annular flexible wall 25 adapted to engage the toe 23. The annuli 24 are split circumferentially to provide a pair of annular legs 26 and 27 which engage the lateral faces of a rigid ring member 28. An annular member 29 is secured to the disc 13 and 14 by bolts 30, and is provided with a flange 31 which compresses the legs 26 and 27 of the annulus 24 in an axial direction to thereby provide a fluid-tight seal and to rigidly secure the legs 26 and 27 to the discs. The ring member 28 is provided with an inflating channel 32 which communicates with a hole 33 in each disc 13 and 14. The annuli 24 may, therefore, be inflated by means of fluid pressure from a suitable source connected through hose 34 and coupling 35 to the hole 33.

As shown in FIG. 1 of the drawings, the annuli 24 in uninflated position assume a flattened shape with the flexible wall 36 extending in substantially axial position and lies radially inwardly of the flange 18. The wall 37 thereof is supported upon surface 38 which extends coextensively with an arcuate surface 39 conforming to the shape of the annulus 24 in its inflated position to thereby restrict the expansion of the annulus 24 in an axial direction during initial inflation thereof.

Annulus 24 is preferably provided with suitable flexible reinforcements such as cords, or the like, having limited extensibility to restrict the extensibility of the annulus without restricting the flexibility thereof. As the annulus 24 is inflated it rolls along the surface 38 and assumes the bulbous shape in cross section as shown in FIG. 2. Since surface 39 of member 29 restricts movement in an axial direction, and legs 26 and 27 secured to the disc, further restrain such movement, the annulus moves radially outwardly and rolls along surface 38 axially of the shaft 10 towards the toe 23 of the carcass. Continued inflation of the annulus 24 causes it to assume a shape as shown in FIG. 2 whereby the annulus exerts a positive force against the toe 23 of the bead 21 to thereby hold the heel 19 against flange 16 and effect an air-tight seal between the flexible wall 25 of the annulus 24 and the toe portion 23 of the carcass.

With the tire carcass 15 mounted on the disc 13 and 14 and the annuli 24 inflated so as to urge the respective heel portions 19 of the tire carcass 15 into engagement with the flanges 16 and to seal the toe portions 23 of the tire carcass, it is seen that an inflatable chamber 40 is formed by the tire and discs which may in turn be inflated by introducing fluid pressure from a suitable source through the hose 41, coupling 42, communicating with hole 43 through the disc 14. The chamber formed by the carcass 15 and discs 13 and 14 may be deflated through a suitable valve 44 extending through the disc 14.

As the chamber 40 is inflated, the discs 13 and 14 may be uniformly moved axially towards each other so that the carcass 15 assumes tire shape, or a toric shape, as shown in FIG. 3 of the drawings. Although any suitable means may be used for positively and uniformly moving the discs 13 and 14 towards each other, a manually operated screw mechanism has been found to function adequately. The shaft 10 is provided with a block 45 secured thereto by screws 46 at the axial midpoint between discs 13 and 14. A screw shaft 47 is journalled within the block 45 and held against axial movement by the lock rings 48. Screw blocks 49 having threads meshing with those of shaft 47 are secured respectively by pins 50 and 51 to the cylindrical members 11 and 12. The pins 50 and 51 pass through diametrically positioned slots 52 and 53 formed in the shaft 10 which restrains the blocks 49 from rotating while permitting axial movement thereof. Suitable means, such as O-rings 54 and 55 are provided between the cylindrical members 11 and 12 and the shaft 10 to maintain the air-tight seal within the chamber 40. It is thus seen that as the screw shaft 47 is rotated by means of a suitable hand lever 56, the cylindrical members 11 and 12 supporting the discs 13 and 14 may be moved axially of the shaft 10 toward each other at a uniform rate as the chamber 40 is inflated through the hose 41.

After the carcass 15 has been shaped into tire form, as shown in FIG. 3, the shaft 10 may be rotated to complete the building of the tire carcass. That is, additional longitudinal inextensible breakers and tread may be applied to the carcass 15 after it is shaped into torque form. If the carcass 15 is of conventional construction it may then be cured.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus for shaping a green tire carcass built in the form of a band comprising a pair of spaced rigid annular members, each having an outer peripheral surface adapted to support one of the beads of an unshaped green tire carcass, said surfaces being adapted to engage the beads to prevent the beads from moving axially outward and forming with said beads an enclosed chamber, means for introducing a fluid under pressure into said chamber, a rigid annular support within said chamber and secured to said annular members, an inflatable annulus positioned on each of said supports, said annuli laying radially inwardly of the beads of said green tire carcass when uninflated, means to inflate each annulus, said annuli each having an expansible circumferential wall which when inflated engages the respective toe portion of said beads to seal the same against leakage of fluid from the chamber and exerts an axially outward force on the toe area of the bead, and means for moving said annular members together as fluid is introduced into said chamber.

2. An apparatus as claimed in claim 1 in which said expansible wall of each respective annulus moves both radially outward and axially toward the toe of the bead during inflation thereof.

3. An apparatus as claimed in claim 1 in which one side of each of said annuli is secured to said annular support and the reamining portion thereof is folded upon itself and extends axially toward the center of said chamber when uninflated.

4. An apparatus as claimed in claim 1 in which said flexible wall assumes a bulbous shape during inflation and initially engages the toe area of the bead and upon further inflation rolls along said support into engagement with the toe area of the bead.

5. An apparatus as claimed in claim 1 in which said annuli are formed of fabric reinforced elastomeric material, said fabric having limited stretchability to control the amount of stretch of said annuli and to insure uniform expansion thereof at substantially all points about its periphery.

References Cited in the file of this patent

UNITED STATES PATENTS

| | | |
|---|---|---|
| 1,289,771 | Hopkinson | Dec. 31, 1918 |
| 1,474,149 | Hopkinson | Nov. 13, 1923 |
| 1,525,455 | Logan | Feb. 10, 1925 |
| 1,789,143 | Kraft | Jan. 13, 1931 |
| 2,814,330 | Vanzo | Nov. 26, 1957 |
| 2,951,526 | Haase | Sept. 6, 1960 |
| 2,986,196 | Frazier | May 30, 1961 |

FOREIGN PATENTS

| | | |
|---|---|---|
| 1,221,091 | France | Jan. 11, 1950 |